United States Patent
Wilson et al.

(10) Patent No.: US 8,949,858 B2
(45) Date of Patent: Feb. 3, 2015

(54) AUGMENTING USER INTERFACE ELEMENTS WITH INFORMATION

(75) Inventors: Darren P. Wilson, London (GB);
Nicholas R. Richards, London (GB);
Aras Bilgen, Hillsboro, OR (US); Dirk Hohndel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 13/525,999

(22) Filed: Jun. 18, 2012

(65) Prior Publication Data
US 2013/0339884 A1   Dec. 19, 2013

(51) Int. Cl.
    G06F 3/00   (2006.01)
(52) U.S. Cl.
    USPC .......................................... 719/318; 715/700
(58) Field of Classification Search
    None
    See application file for complete search history.

(56) References Cited

U.S. PATENT DOCUMENTS

| | | | |
|---|---|---|---|
| 8,411,109 B2 * | 4/2013 | Kramer et al. | 345/619 |
| 8,823,667 B1 * | 9/2014 | Hill | 345/173 |
| 2004/0250204 A1 * | 12/2004 | Isaacson | 715/517 |
| 2005/0188057 A1 * | 8/2005 | Joo | 709/219 |
| 2007/0287505 A1 * | 12/2007 | Shin et al. | 455/566 |
| 2010/0302277 A1 * | 12/2010 | Jiang et al. | 345/650 |
| 2011/0202847 A1 * | 8/2011 | Dimitrov | 715/738 |
| 2013/0055081 A1 * | 2/2013 | Limbasia et al. | 715/716 |
| 2013/0311938 A1 * | 11/2013 | Frazier et al. | 715/781 |

* cited by examiner

Primary Examiner — Charles E Anya
(74) Attorney, Agent, or Firm — Schwabe, Williamson & Wyatt, P.C.

(57) ABSTRACT

Embodiments of methods, systems, and storage medium associated with a user interface with information augmented elements are disclosed herein. In one instance, the method may include a computing device determining additional information related to a user interface (UI) control element of a user interface of an application or an operating system component, and augmenting a display of the control element with the additional information. In embodiments, the UI control element may be adjusted so as to accommodate the augmenting a display of the UI control element with the additional information. Other embodiments may be described and/or claimed.

23 Claims, 7 Drawing Sheets

AUGMENTING USER INTERFACE ELEMENTS WITH INFORMATION

FIELD

Embodiments of the present disclosure generally relate to the field of data processing, and more particularly, to techniques for providing user interfaces.

BACKGROUND

In data processing, interacting with a user interface involve user decisions as to how to reach a desired outcome of such interactions. Typically, a user may go through multiple steps of using available user interface controls (e.g., provided by a user interface of an application, such as a browser) until the desired outcome may be reached. Often, the user may not know or anticipate the results of the user interface control-related actions until she actually uses a particular interface control. As a result, the user may not be able to make informed decisions about the expected results of selecting particular user interface controls. Accordingly, unexpected results or errors may occur as a result of such user interface control selections that may negatively affect the user experience with a particular user interface.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Techniques are presented for providing user interface (UI) control elements with relevant information associated with the UI control elements to enhance the user-friendliness of the UI. In embodiments, the UI may be associated with an application, an operating system component, and so forth (hereinafter, simply "application"). The relevant information may inform the user of possible results of user interaction with the UI control elements before the interaction occurs. Many software applications accessed by a user on a computing device spread their functionality across multiple screens and layouts. Every user session with an application rendered on a computing device consists of multiple user interactions with the applications' UI control elements (e.g., buttons, windows, menus, icons, and other selectable elements, also known as widgets). Techniques described herein provide for augmenting an application's UI control elements with information associated with content and/or context corresponding to the UI control elements. The rendered information may enable a user to ascertain the outcome of the interaction with a particular UI control element or elements and to make informed decision as to which UI control element is the best selectable choice in a particular instance of the user session with the application.

For example, a UI control element may be augmented with data associated with user interactions with the application or content associated with the application, data related to a particular functionality associated with the UI control element of the application, data related to the status or context of the application or functionality associated with the application, and the like. This data may be visualized and rendered to the user in association with the UI control element, e.g., to replace, or to add to, existing static definition of the UI control element. In another example, a UI control element may be augmented with information representing content or context associated with the UI control element. The information may include images, text, thumbnails, links, and other types of information. The UI control elements, when augmented with relevant information, may adjust their visual properties such as size, location, color scheme, motion, and other visual characteristics so as to accommodate the information to be rendered to the user.

The information for augmenting UI control elements may be gathered in a number of different ways. For example, the information may be heuristically determined based on the user actions or user preferences. The information may be deterministic, static additions to the user interface declared, for example, at coding time. The information may also include dynamically obtained and processed content and/or context associated with the UI control elements. For example, the information may include a summary of the Web page associated with a particular UI control element (e.g., a tab). The content summary may be produced by obtaining content information from the content source (e.g., data repository where content served for a particular content resource resides or from the content rendered by the content resource (e.g., a Web site) and processing the obtained content to provide the content summary. As another example, the information may include resource utilization of an execution environment of the application.

In an embodiment, depending on the specific situation during the user session and available screen real-estate, the UI control elements (e.g., icons or buttons commonly used in applications) may be replaced with the UI control elements augmented with relevant information as described above. A switch to an augmented UI control element rendering the preview of associated content or functionality may be caused by detected user intent to select a particular UI control element. The user intent may be discerned from detecting a movement of a selecting element such as a cursor toward a particular area of the user interface that may be designated for such detection. For example, hovering with a cursor over a particular area proximate to the UI control element or a sensing a user's finger or stylus near or over the UI control element in case of a touch-sensitive screen may be indicative of the user intent to select the UI control element. A user interface area proximate to one or more UI control elements may be configured to receive a user input, such as a movement of a selecting user interface element within the area. The received input, when detected, may cause subsequent actions leading to the augmentation of one or more UI control elements with relevant information as described herein.

Figure 1:
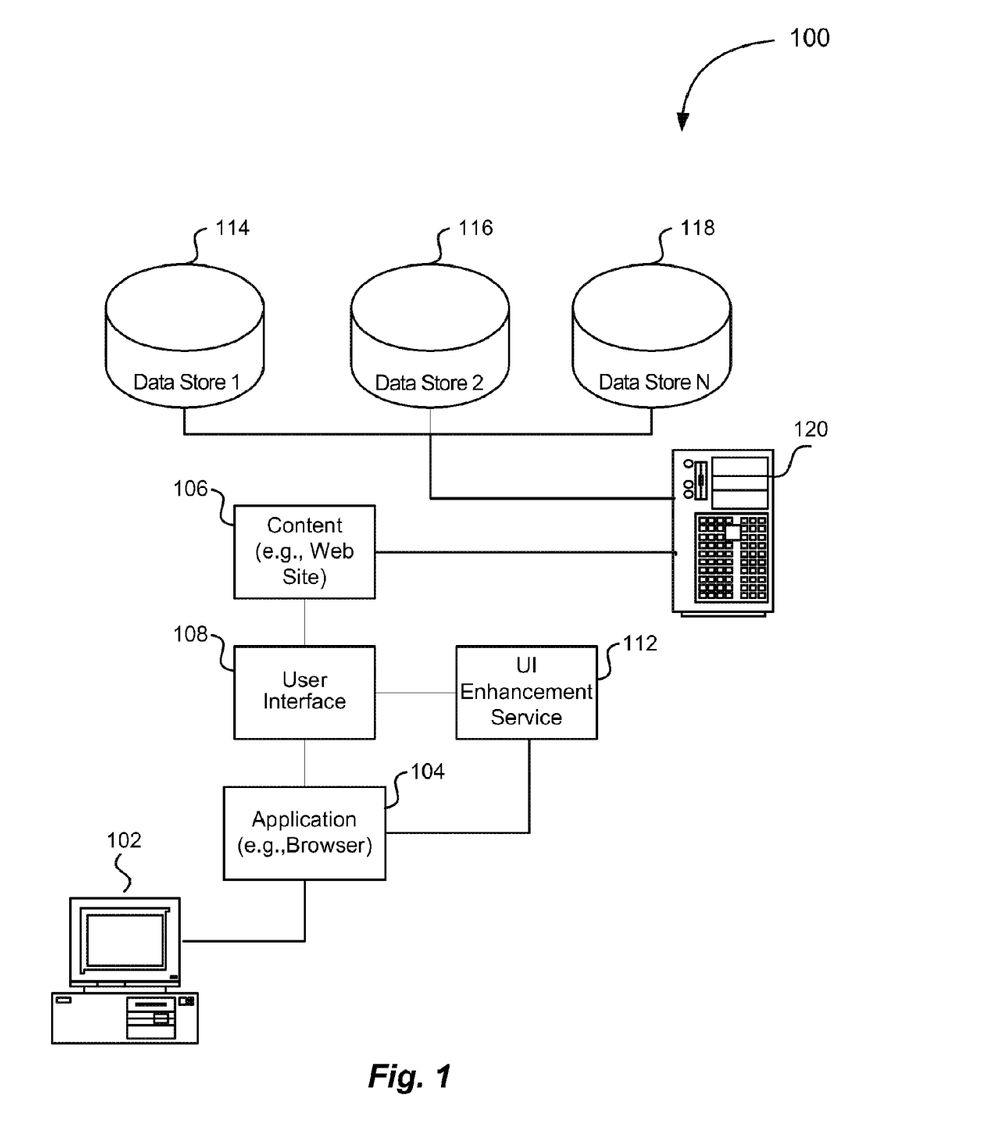
FIG. 1 illustrates an environment in which various embodiments can be practiced in accordance with some embodiments.

FIG. 1 shows an illustrative environment 100 in which the aspects of user interface enhancement described herein may be implemented in accordance with some embodiments. In an embodiment, the environment 100 of FIG. 1 may be utilized to enhance the user interface provided by an application 104 (e.g., a browser), which renders content (e.g., a Web site) 106 via a user interface 108 using a UI enhancement service 112 described herein. The enhancement may include additional information to augment the basic information provided by application 104 for the UI control element. It is to be understood that the UI enhancement service 112 may comprise a number of various implementations, including, but not limited to, a software application component executed on a computing device, such as a client device 102 or a Web server 120. In one embodiment, the service 112 may be offered as a part of remote computing services that together make up a cloud computing platform, offered over the Internet. The service may be configured to run in a Web server environment, such as a pure Java HTTP Web server environment.

In an embodiment, the environment 100 may include a client computing device 102 utilized by a user for interaction with electronic entities that provide content. Content may be accessed by the device 102 through the browser 104. The content may be stored in one or more remote content data stores 114, 116, and 118 and may be utilized by merchants, Web sites, or other entities in order to provide users an opportunity to search for, and view, content by navigating to a Web site 106 operated, for example, through a Web server 120. The data stores may be accessible (e.g., with a search engine) through the Internet or any other type of computer network known in the art.

In an embodiment, a UI enhancement service 112, operating on the device 102, may be configured to, in response to detecting a user input, augment UI control elements of the user interface 108 with information associated with one or more content items (e.g., Web pages) rendered by the application 104 to the user device 102. For example, when a user interaction with an area proximate to a particular UI control element is detected, the data corresponding to the content associated with the UI control element may be assembled, e.g., from one or more data stores 114, 116, 118 and displayed to the user with association with the UI control element rendered by the application (e.g., browser) 104 on the computing device 102.

In an embodiment, the UI enhancement service 112 may be implemented as a trusted script, for example, a JavaScript®. In some embodiments, the trusted script may also be implemented as ActionScript®, VBScript®, Java Servlet®, Flash®, JScript® or other scripting languages. In some embodiments, the trusted script 112 may be implemented as an extension (i.e., a plug-in application) to the browser 104. In some embodiments, the trusted script 112 may be loaded on a page of the Web site 106 when a user accesses the Web site. In general, the trusted script 112 does not have to be Web site-specific; the script may be provided as a part of a browser or be installed as an extension to a browser.

The trusted script comprising the UI enhancement service may be configured to detect a user interaction with an area proximate to a particular UI control element of the user interface 108, access content data stores 114-118, retrieve information associated with the content corresponding to the UI control element, process the retrieved content to produce a content summary, and render the processed content with the UI control element. In some embodiments, the trusted script may be further configured to adjust the size of the UI control element in order to accommodate the processed content summary.

FIGS. 2-6 illustrate various embodiments of user interfaces enhanced by the UI enhancement service. The embodiments illustrated in FIGS. 2-6 do not limit this disclosure to the described embodiments, but merely present different examples of the implementation of the user interface enhancement described herein.

Most browsers allow for tabbed user experience when navigating between different Web pages. Tabbed browsing allows users to group viewed Web sites together in a single window. Because the modern browsers make it easier to open a new tab than to open a new window, the users typically use a single window with multiple tabs open. The tabs in modern browsers often use two pieces of information to represent a Web site: the site logo and the title of the site. The title is almost always truncated to fit within the available tab width. When many tabs are open, it may be cumbersome to find a tab by reading incomplete tab labels. Accordingly, tab controls that are enabled to show comprehensive information associated with the corresponding Web site may assist a user with identifying tabs easily and making a correct selection. As described below in reference to FIGS. 2-3, the tabs may be made context sensitive and reveal the content-associated information only when a cursor is detected is near the tab bar, hence saving space to show more content on the screen.

Figure 2:
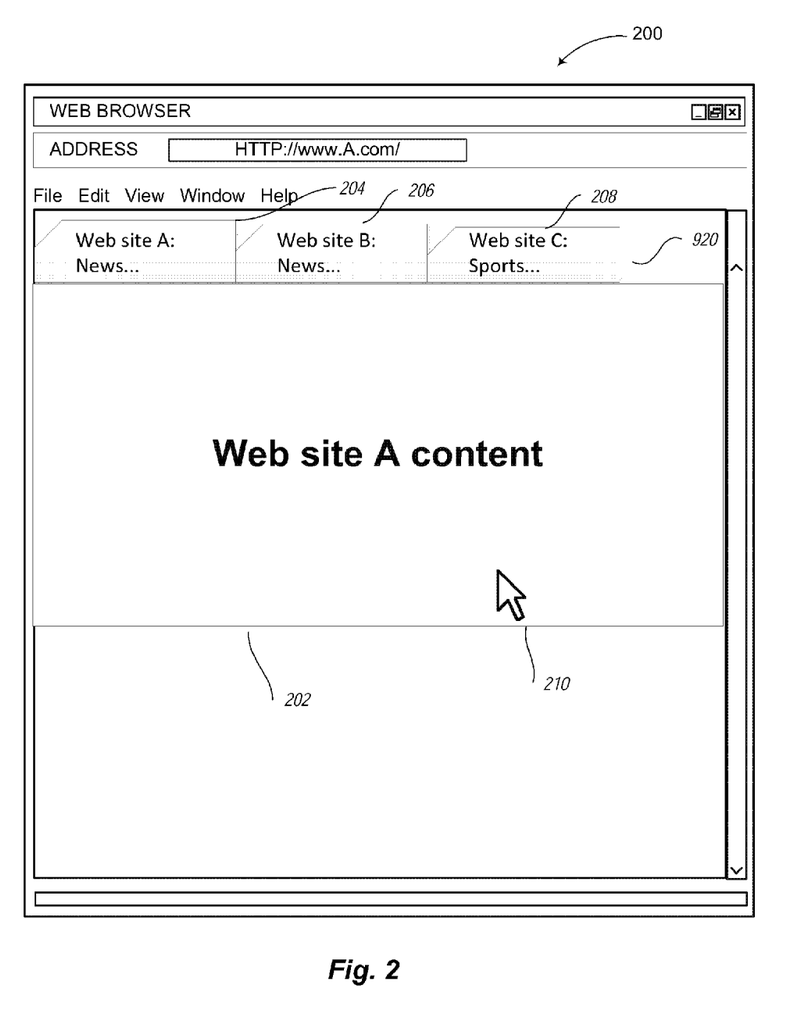
FIGS. 2 and 3 illustrate example screenshots of a user interface with the user interface (UI) control elements enhanced in accordance with an embodiment.

FIG. 2 illustrates a browser 200, which renders for display Web sites A, B, and C. As shown, Web site A 202 having a UI control element in a form of a tab 204 is currently displayed, whereas Web sites B and C are represented by their tabs 206 and 208. As known, tabs associated with content such as Web pages typically show a site symbol and/or brief description of the site, as shown in FIG. 2. A user may interact with the content 202 using, for example, a cursor 210.

Figure 3:
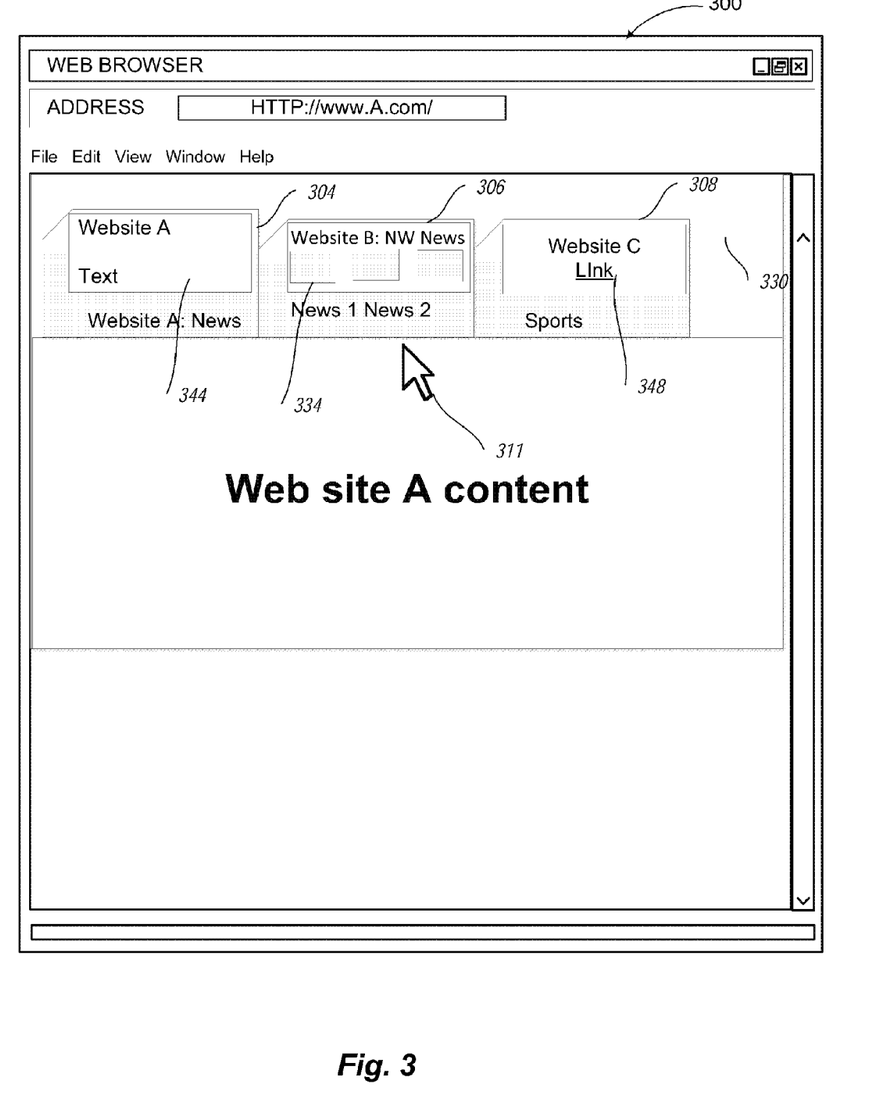

The tabs may be context sensitive and reveal the site-associated information when the cursor moves to an area proximate to the tabs or when the cursor moves to (e.g., hovers over) one the tabs. For example, moving cursor to the area indicated by the numeral 920 may trigger UI control elements (tabs) augmentation with relevant information. Accordingly, if a user moves the cursor 310 to a new location 311 proximate the area 330 (e.g., proximate to a particular tab 306 associated with Web site B as shown in FIG. 3), the UI enhancement service may obtain information associated with the Web site B, process the obtained information to produce a summary of information, and display the processed information within the tab 306. In alternate embodiments, enhancement service may pre-obtain and/or pre-process the information associated with the Web site B, prior to the user moving cursor 311 into the area 330.

In an embodiment, one or more displayed tabs, e.g., 304, 306, and 308 may display information associated with their respective Web sites A, B, and C, as shown in FIG. 3. The displayed information may include summaries of Web site content in various forms, including text 344, icons (not shown), pictures (not shown), thumbnails 334, links 348, and other types of content representation. In one embodiment, the summaries or different parts of the summaries (e.g., thumbnails) may be shown when the user is trying to change tabs (e.g., hovering the cursor over the tab 306) and may be hidden otherwise.

The tabs 304, 306, 308 may change size when displaying information. For example, the tabs may expand based on the location of the cursor 311 as shown in FIG. 3B. As illustrated, the tabs 304, 306, and 308 are expanded in size relative to their counterparts 204, 206, and 208 shown in FIG. 2. Accordingly, augmenting UI control elements, such as tabs 204, 206, 208 with relevant information shown in 304, 306, 308 enables a user to preview the results of using one of the rendered UI control elements when navigating between Web pages displayed by the browser 300.

Most common browsers today have a "Back" button, a "Forward" button, and a URL bar for navigation. When the user visits a page, the page may be added to the history stack. The user may move in the history stack to navigate to a previous page or the next page by using the "Back" and "Forward" buttons, respectively. Using the "Back" button in some situations may involve some ambiguity with respect to anticipated results of such use. For example, the "Back" button of a browser, when accessed by a user, may take the user to different Web pages, depending on the browsing context and functionality of the browser, e.g., "the page accessed before the current page" or "the previous state of the browsing history page stack." Accordingly, at least in some situations, a user may be taken to a "wrong" page when using a "Back" button or otherwise face unexpected results of the user of the "Back" button. A user interface control enhancement described below in reference to FIG. 3 in accordance with an embodiment enables the user to avoid unexpected results when attempting to navigate through the user's browsing history.

Figure 4:
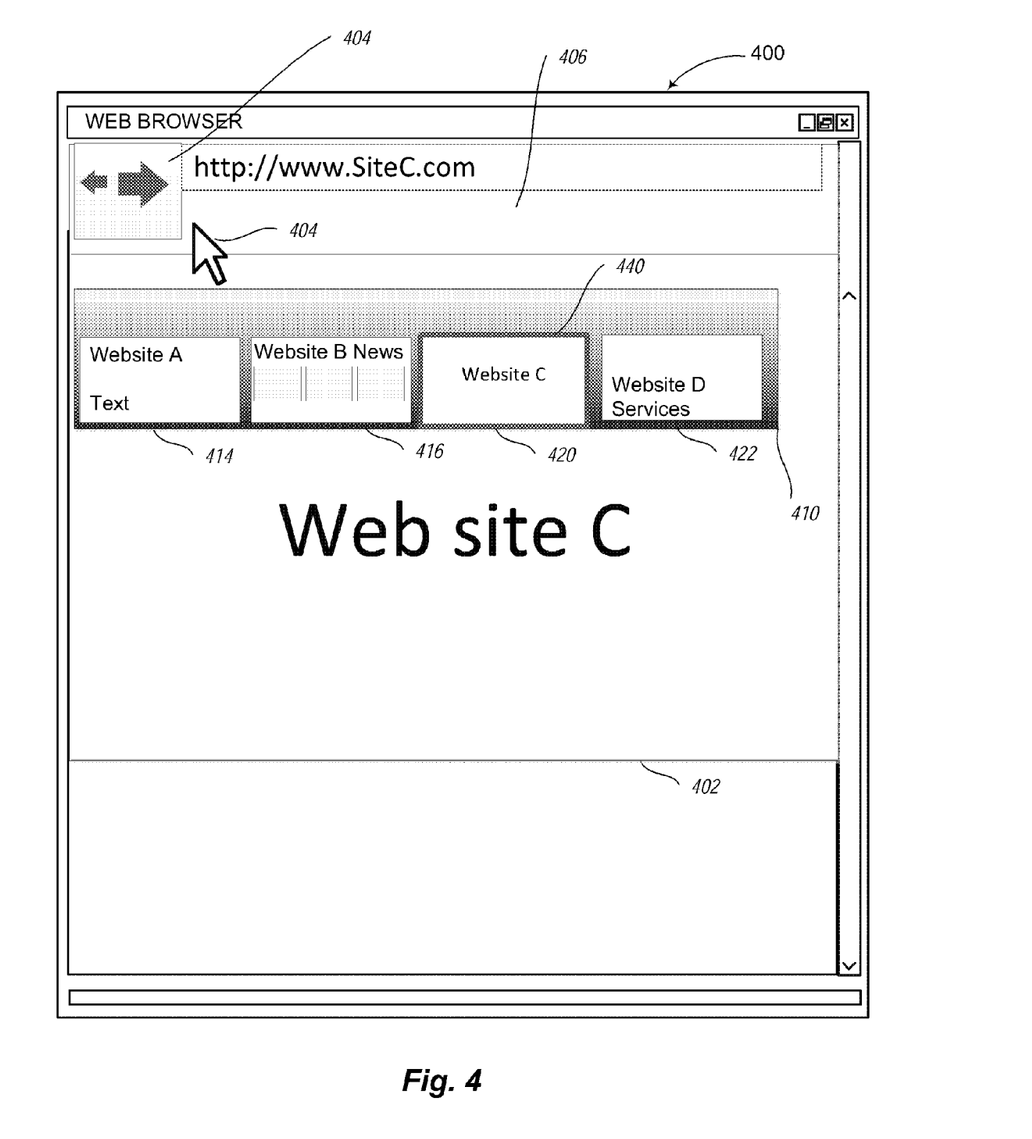
FIG. 4 illustrates another example screenshot of a user interface with the UI control elements enhanced in accordance with an embodiment.

FIG. 4 illustrates a browser 400 rendering content 402, such as Web site C to the user. The "Back" and "Forward" buttons 404 are shown in the upper left area of the browser 400's user interface 406. In an embodiment, when a cursor 404 movement is detected in a particular designated area, such as the area 404 proximate the "Back" and "Forward" buttons, the user browser history may be displayed to the user as described below in greater detail. Assume that the user visits Web site A, then Web site B, then Web site C, and then Web site D. The user is currently visiting Web site C as illustrated in FIG. 4. The UI control element, associated with the Web site C 402, i.e., a tab 420 may be displayed in a different manner, for example, enlarged or otherwise visually marked differently from the other UI control elements (tabs 414, 416, and 422) in order to emphasize the currently viewed Web site. In the illustrated example, the tab 420's contour is bolded as indicated by numeral 440.

The tabs 414, 416, 420, and 422 may represent the browsing history of the user during the current browsing session. The tabs may be displayed to the user when the user moves the cursor 404 to or proximate the area containing "Back" and "Forward" buttons 404, for example. In another example, moving cursor 404 to a particular area of the browser user interface 406, such as the area 410 allocated for displaying the tabs 414, 416, 420, and 422, may cause the tabs 414, 416, 420, and 422 to be rendered for display. In yet another example, the tabs associated with the visited Web sites may appear as the user moves between Web sites during the browsing session.

The content displayed in association with the tabs 414, 416, 420, 422 may be obtained, processed, and displayed in a manner similar to that discussed above in reference to FIGS. 2A and 2B. As shown, UI control elements (tabs) 414, 416, 420, 422 each display summaries of their respective Web sites A, B, C, and D.

Accordingly, a user may avoid potential errors associated with using "Back" and "Forward" buttons of a browser by using UI control elements that visually summarize the user's browsing history, including "back" and "forward" states in a single view as illustrated in FIG. 4. The user, when informed about the content of the visited Web sites via displayed content summaries, may select the desired Web site from the rendered UI control elements 414, 416, 420, 422.

Some operating systems of computing devices, such as mobile computing devices are configured to provide "status bars" as a part of a user interface of the computing device. The status bars of mobile operating systems may be configured to render little bits of information, such as time, updates, carrier status, number of active applications, and the like. The status bars are designed as relatively compact components of the user interface in order to save screen space on a device, such as a smartphone, a netbook, or a mobile Internet device (MID). The device may be a part of or associated with, a particular computing system, for example, a car navigation system or a smart transportation system utilized in transport or automobile industry. In a typical implementation such as a standard smartphone, the user needs to view an item to get more details about the item indicated in the status bar. For example, a user may have to launch an application indicated in the status bar in order to see what the application does.

Figure 5:
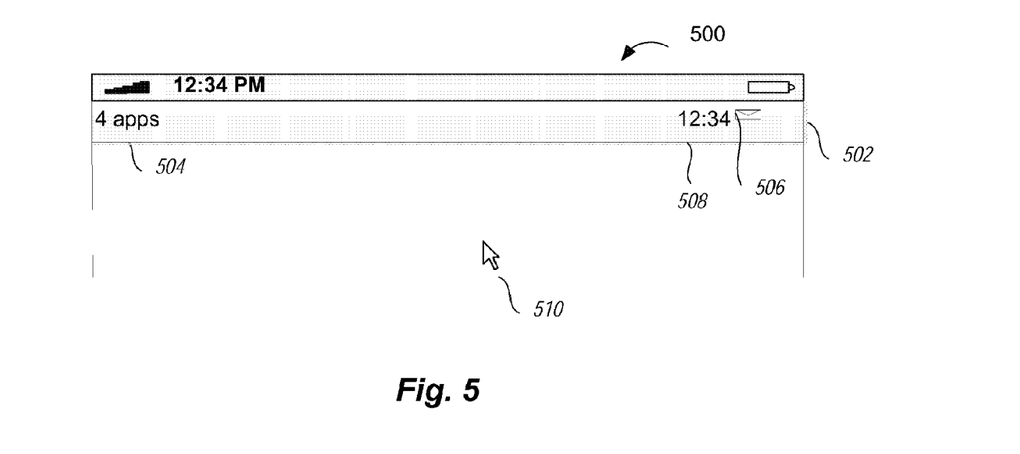
FIGS. 5 and 6 illustrate yet another example screenshots of a user interface with the UI control elements enhanced in accordance with an embodiment.

FIG. 5 illustrates a portion of a user interface 500 of a computing device, such as a smartphone. The user interface 500 includes a status bar 502 having status indicators indicating, for example, that there are four active applications currently available to the user, an incoming email message 506, and a present time 508. The user interface may be navigated in a number of different ways, for example, using a cursor 510, using arrow keys of a keyboard, tapping on a screen (in case of a touch sensitive screen), and the like.

Figure 6:
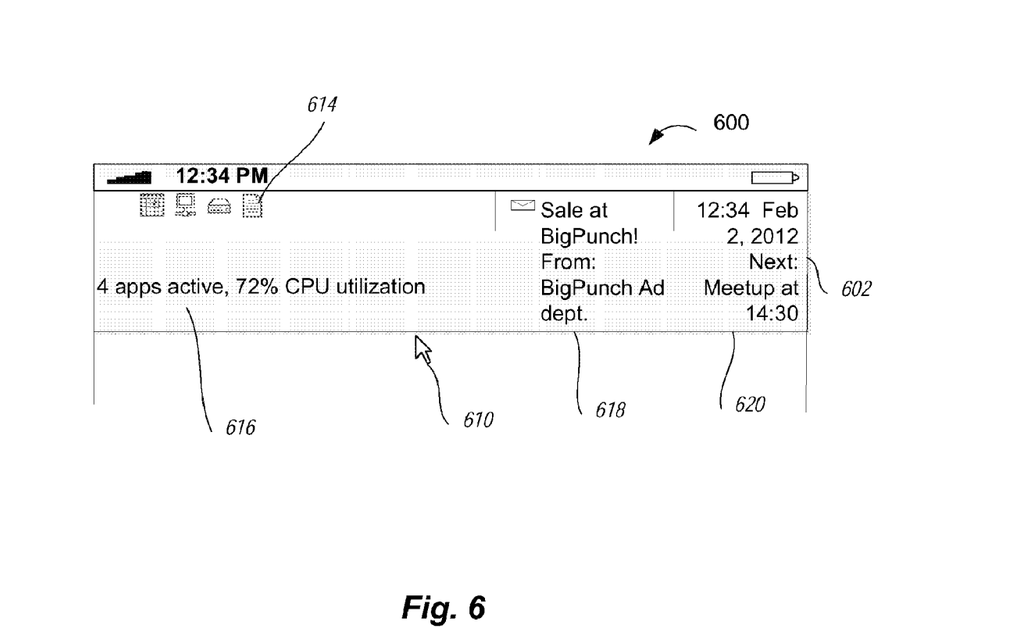

As shown in FIG. 6, when the cursor 510 is moved to a new position 610 to an area of the user interface 600 that is proximate to the status bar 602, the status bar may be augmented with context information describing the current status of the active applications, functionality of the applications, resource consumption of the applications, an icon identifying the application, and other types of information as shown in 602. As shown, each of the active applications may be represented by a corresponding icon 614. In an embodiment, each application icon 614, when selected, may launch a respective application.

Additional information regarding the status of the applications and the operating system, such as the computer resources utilization of an execution environment 616 may be displayed. Relevant information 618 about the incoming email 506 may be displayed in the status bar 602. Relevant time, date, and next appointment or meeting information 620 may be also displayed as an expansion of the time information 508. As described above for the browser embodiment with reference to FIGS. 2 and 3, the status bar 502 may likewise be expanded in size (602) in order to accommodate the relevant information 614, 616, 618, 620.

The information 614, 616, 618, 620, may be obtained from corresponding applications and services (e.g., email service) currently active on the computing device. In an embodiment, a device operating system may include the UI enhancement service described in reference to FIG. 1 and configured to gather necessary information from active applications, process the gathered information, and render the processed information with the status bar. In an embodiment, different types of user actions, when detected by the UI enhancement service, may cause the UI control element (status bar) enhancement. For example, the user may tap on the user interface area containing the status bar if the screen of the device is touch-sensitive.

In an embodiment, applications residing on a computing device may be configured to initiate a dialog with the UI enhancement service. For example, the applications may be configured to offer relevant information to the UI enhancements service for use upon detection of the user interaction with the status bar or a user interface area proximate the status bar as described above. In one example, the information offered by an application to the UI enhancement service may include initial information regarding an application (similar to that indicated by the numeral 504), an icon or other application identifier (614) that may be rendered upon detection of the user interaction with the UI proximate or on the status bar, and additional information about the application 616, which may also be rendered upon detection of the user interaction with the UI proximate or on the status bar (e.g., hovering the cursor or finger-tapping). Accordingly, configured applications may render application information for display on the enhanced status bar 602. In another embodiment, the UI enhancement service may be configured to initiate a dialog with the active applications and retrieve the desired application-related information.

Figure 7:
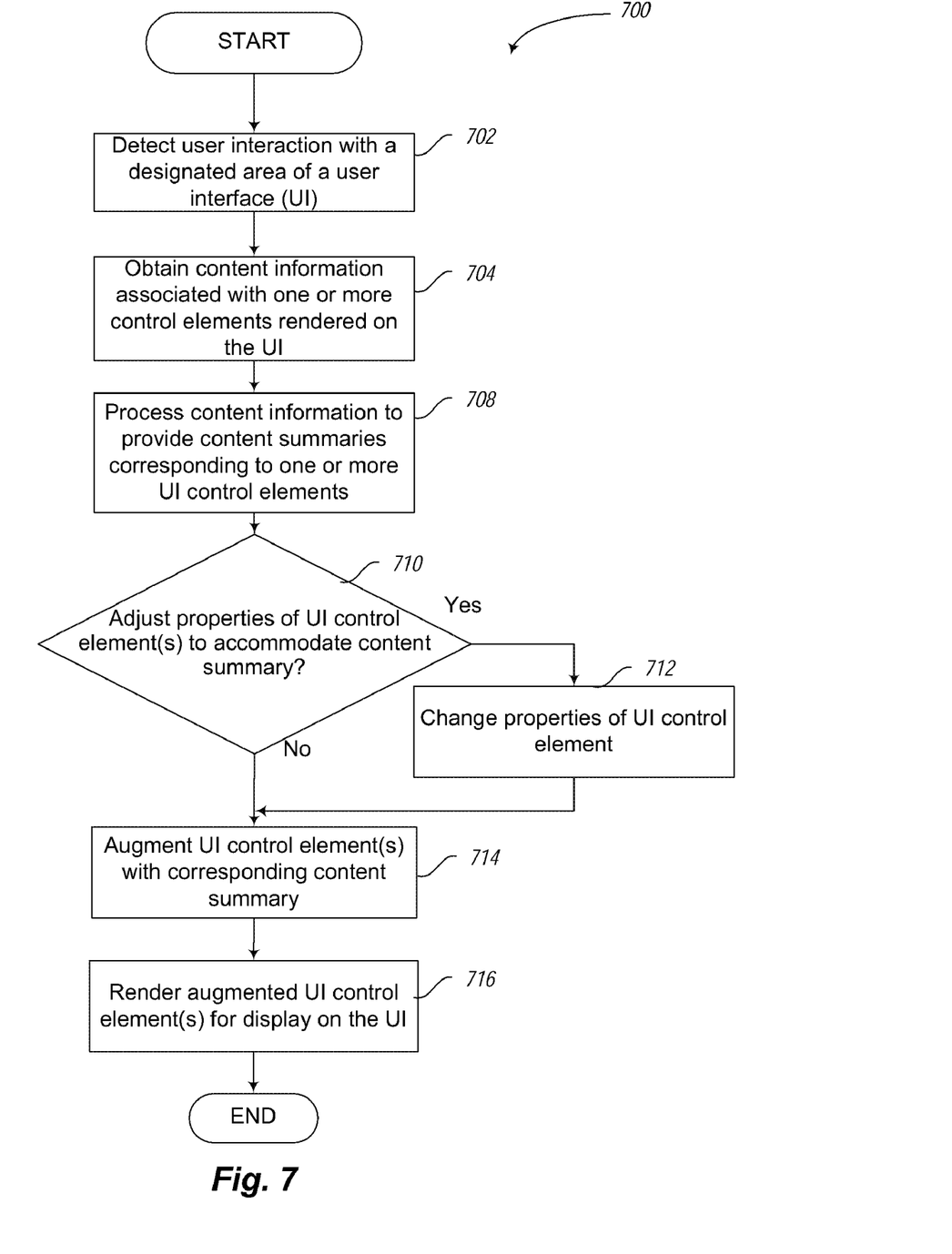
FIG. 7 illustrates a process flow diagram for a user interface enhancement in accordance with an embodiment.

FIG. 7 is a process flow diagram 700 for enhancing the UI control element(s) of a user interface of an application in accordance with an embodiment. As discussed above, the application may be a browser, a component of an operating system of a computing device, and the like. The process 700 begins at block 702, where the user interaction with a designated area of the user interface of the application is detected. The user interaction may take a number of different forms. For example, as a user interface selecting element, e.g., a cursor gets close to a UI control element on a computing device screen or as a user's linger approaches the element in a touch-sensitive environment (e.g., touch screen), the appearance of the UI control element may change so as to show the previews of the results of using the UI control element. In another example, the user may hover with the selecting element (cursor, finger, and the like) over the UI control element or in the vicinity of the UI control element, which may trigger an enhancement of the UI control element and, in some embodiments, enhancement of one or more UI control elements located adjacent to the UI control elements, or enhancement of all UI control elements of the same type (e.g., tabs) currently present in the user interface.

In yet another example, the UI control element may be augmented in response to a detection of a user interaction of a particular area of the user interface, such as an area in which UI control elements are located, or any other designated area. In an embodiment, the designated area configured to be responsive to a user interaction may be located proximate to the existing UI control elements. One or more of these elements may be augmented with corresponding content information in response to the user interaction with the designated area (e.g., moving cursor to the area, entering the area with the arrows on the keyboard, touching the area if the screen is touch-sensitive, and the like).

In yet another example, a movement of a selecting element (cursor) toward a particular UI control element may be detected and, in response to the detection, the UI control element may be augmented with information associated with the content corresponding to the UI control element.

At block 704, relevant information associated with the one or more UI control elements may be obtained in the response to the detection that occurred at block 702. The relevant information may include content or context information associated with the content corresponding to the UI control element. The relevant information may include a description of the functionality of the UI control element. The information for augmenting UI control elements may be gathered in a number of different ways. For example, the information may be heuristically determined based on the user actions or user preferences. The information may be deterministic, static additions to the user interface declared, for example, at coding time. The information may also include dynamically obtained and processed content associated with the UI control elements.

At block 708, the obtained content or context information may be optionally processed to produce, for example, content or context summary associated with the UI control element. The content or context summary may include brief descriptions of the content (e.g., a Web page) or context associated with the UI control element (e.g., a tab) and may take different forms: textual, photo, icons, logos, thumbnails and other types of content items.

At decision block 710, it is determined, for each of one or more UI control elements, whether the UI control element should be adjusted (e.g., changed in appearance, size, font, colors, animation, and the like) in order to accommodate the obtained content or context summary associated with the UI control element. The determination may depend on characteristics of the content or context summary to be rendered with (in one example, within) the UI control element. For example, it may be determined that the obtained summary including all possible visual elements (text, thumbnails, photos, etc.) may require a space of a particular size. It may be determined that the size or other properties of the existing UI control element have to be adjusted to accommodate the summary. If it is determined that the UI control element is to be adjusted, at block 712 necessary adjustments to the UI control element are made. The process then moves to block 714, where the basic information of the UI control element may be augmented with the corresponding additional content or context summary information. For example, the content or context summary information may be placed within the UI control element (e.g., a tab). At block 716, the augmented UI control element may be rendered for display on the user interface.

Figure 8:
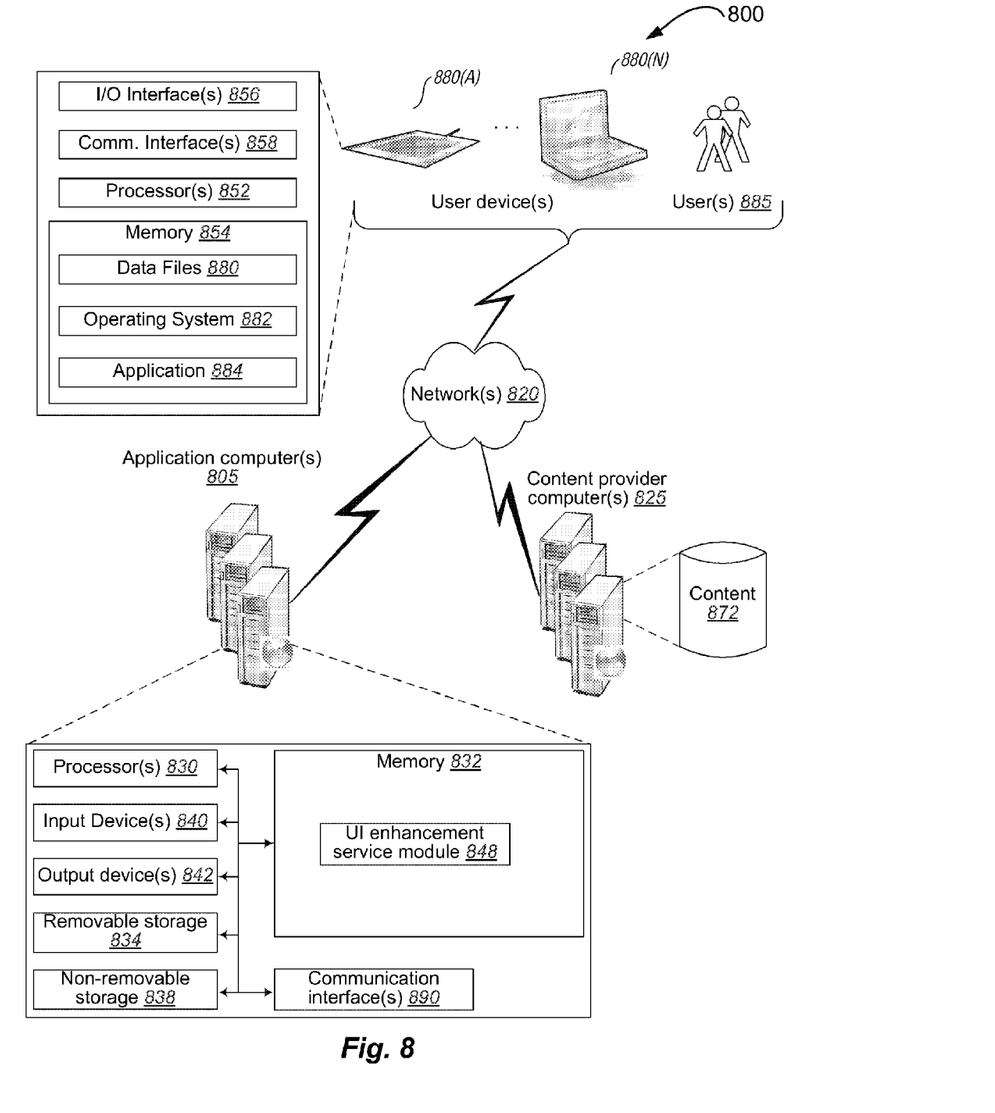
FIG. 8 illustrates an environment in which various embodiments may be implemented in accordance with some embodiments.

FIG. 8 illustrates an example of an environment 800 for implementing aspects of the user interface enhancement in accordance with various embodiments. As will be appreciated, although a Web-based environment is used for purposes of explanation, different environments may be used, as appropriate, to implement various embodiments. The environment 800 includes one or more electronic client (user) devices 880(A)-880(N), which may include any appropriate device operable to send and receive requests, messages, or information over an appropriate network 820 and convey information back to a user 885 of the device. Examples of such client devices may include, but are not limited to, personal computers, cell phones, handheld messaging devices, laptop computers, set-top boxes, personal data assistants, electronic book readers, tablets, game consoles, and the like. These devices may also include workstations running any of a variety of commercially available operating systems and other known applications for purposes such as development and database management. These devices may also include other electronic devices, such as dummy terminals, thin-clients, gaming systems, and other devices capable of communicating via a network. The user devices 880(A)-880(N) may include a processor 852 and memory 854 for storing processor-executable instructions, such as data files 880, operating system 882, and one or more applications 884, such as a browser, for example.

The devices may further include at least one or both of the following elements: input/output interface 856 designed to enable peripheral component interaction with the system 800 and communication interface 858. In various embodiments, the input/output interface 856 may include, but is not limited to, a display, e.g., a liquid crystal display, a touch screen display, etc., a speaker, a microphone, a still camera, a video camera, a flashlight (e.g., a light emitting diode flash), and a keyboard. For embodiments including a display supporting touch screen features, the system 800 may include a touch-screen controller for facilitating control of the display. As discussed above, operating system 882 and/or an application 884 may include a UI enhancement service configured to enhance UI control elements of a user interface of the application or the operating system rendered on a device's user interface 858.

The network 820 may include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof. In this example, the network includes the Internet, and the environment includes one or more Web servers (content provider servers) 825 for receiving requests and serving content in response thereto, although for other networks, an alternative device serving a similar purpose could be used, as would be apparent to one of ordinary skill in the art.

The illustrative environment 800 may include at least one application server e.g., group generation service server) 805 including, or associated with, one or more processors 830, input devices 840, output devices 842, removable storage 834, and non-removable storage 890 that may be connected to a communication interface 890 and memory 832. As discussed above, in one embodiment, a UI enhancement service may reside on the server 805 and may execute on a client device 885 or server 805. Accordingly, the memory 832 may include a UI enhancement service module 848.

The handling of all requests and responses, for example, the requests for information initiated by the UI enhancement service, as well as the delivery of content between the client devices 880(A)-880(N) and the application server 805, may be handled by one or more content provider Web servers 825. The content data store 872 may be associated with the server 825. The data store 872 may be operable, through logic associated therewith, to receive instructions from the server 825 and obtain, update, or otherwise process data in response thereto. In one example, the UI enhancement service may submit a request for content associated with a particular UI control element (or elements).

Each server may include an operating system that provides executable program instructions for the general administration and operation of that server, and typically may include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 800 may include a variety of data stores and other memory and storage media as discussed above. These may reside in a variety of locations, such as on a storage medium local to (and/or resident in) one or more of the computers or remote from any or all of the computers across the network. Any necessary files for performing the functions attributed to the computers, servers, or other network devices may be stored locally and/or remotely, as appropriate. The storage media may include non-transitory media such as disk drives, optical storage devices, and solid-state storage devices, such as random access memory ("RAM") or read-only memory ("ROM"), flash memory or other memory technology, CD-ROM, digital versatile disk (DVD) or other optical storage, magnetic cassettes, magnetic tape, magnetic disk storage or other magnetic storage devices, as well as removable media devices, memory cards, flash cards, or any other medium which may be used to store the desired information and which may be accessed by a processor.

The environment 800 may be a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature, and not limited to the scope of the disclosure.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein.

What is claimed is:

1. At least one non-transitory computing device-readable storage medium having executable instructions stored thereon that cause a computing device, in response to execution by the computing device, to cause the computing device, to:

detect a movement of a selecting element on a user interface of an application executing on the computing device toward a control element of the user interface, wherein to detect includes detect the movement of the selecting element inside a designated area of the user interface that is proximate to the control element, wherein the designated area of the user interface proximate to the control element is configured to receive user input including the movement of the selecting element within the area;

in response to the detection, determine whether to adjust properties of the control element;

if the determination is positive, adjust the properties of the control element and augment basic information associated with the control element of the user interface;

otherwise, augment basic information associated with the control element of the user interface, wherein the basic information includes a static definition of the control element and additional information to augment the basic information comprises a content summary of the application associated with the control element, wherein to augment the basic information includes to obtain the content summary from a data repository that stores the content summary provided by the application associated with the control element, and replace the basic information with the content summary of the application or add to the basic information the content summary of the application; and render for display in or proximate to the control element, the augmented basic information of the control element.

2. The computing device-readable storage medium of claim 1, wherein the instructions further cause the computing device to gather content information accessible via the control element, or context information of the control element.

3. The computing device-readable storage medium of claim 2, wherein the instructions further cause the computing device to process the content or context information to generate the augmented basic information.

4. The computing device-readable storage medium of claim 1, wherein the control element is rendered for display in or proximate to an area of the user interface for interaction by a user of the computing device.

5. The computing device-readable storage medium method of claim 4, wherein the executable instruction further cause the computing device to adjust the rendering of the control element to accommodate the rendering of the augmented basic information.

6. The computing device-readable storage medium of claim 1, wherein the application comprises a browser, wherein the control element comprises a tab associated with accessing a Web site, and wherein the additional information comprises content associated with the Web site.

7. The computing device-readable storage medium of claim 1, wherein the application comprises a browser, wherein the control element comprises a button to direct the browser to display a previous Web page, and wherein the additional information comprises content associated with the Web page.

8. The computing device-readable storage medium of claim 1, wherein the control element comprises a tool bar having a status indicator of the application or an execution environment of the application; and wherein the augmented basic information comprises corresponding additional status information of the application or the execution environment.

9. A computing device comprising:
a processor; and
a memory having processor-executable instructions stored thereon that cause the processor, in response to execution by the processor to:
detect a movement of a selecting element on a user interface of an application executing on the computing device toward a control element of the user interface, wherein to detect includes detect the movement of the selecting element inside a designated area of the user interface that is proximate to the control element, wherein the designated area of the user interface proximate to the control element is configured to receive user input including the movement of the selecting element within the area;
in response to the detection, determine whether to adjust properties of the control element;
if the determination is positive, adjust the properties of the control element and augment basic information associated with the control element of the user interface;
otherwise, augment basic information associated with the control element of the user interface, wherein the basic information includes a static definition of the control element and additional information to augment the basic information comprises a content summary of the application associated with the control element, wherein to augment the basic information includes to obtain the content summary from a data repository that stores the content summary provided by the application associated with the control element, and replace the basic information with the content summary of the application or add to the basic information the content summary of the application; and
render for display in or proximate to the control element, the augmented basic information of the control element.

10. The computing device of claim 9, wherein the instructions further cause the computing device to gather content information accessible via the control element, or context information of the control element.

11. The computing device of claim 10, wherein the instructions further cause the processor to process the content or context information to generate the augmented basic information.

12. The computing device of claim 9, wherein the control element is rendered for display in or proximate to an area of the user interface for interaction by a user of the computing device.

13. The computing device of claim 12, wherein the executable instructions further cause the processor to adjust the rendering of the control element to accommodate the rendering of the augmented basic information.

14. The computing device of claim 9, wherein the application comprises a browser, wherein the control element comprises a tab associated with accessing a Web site, and wherein the additional information comprises content associated with the Web site.

15. The computing device of claim 9, wherein the application comprises a browser, wherein the control element comprises a button to direct the browser to display a previous Web page, and wherein the augmented basic information comprises content associated with of the Web page.

16. The computing device of claim 9, wherein the control element comprises a tool bar having a status indicator of the execution environment indicating a number of applications executing in the execution environment, and wherein the augmented basic information comprises resource utilization information of the execution environment.

17. The computing device of claim 9, wherein the computing device is selected from one of: a smartphone, a mobile Internet device, a laptop computer, a desktop computer, a server, a set-top box, or a game console.

18. The computing device of claim 9, wherein the computing device is associated with a transportation system.

19. A computer-implemented method for providing user interface control elements to an application, the method comprising:
detecting, by a computing device, a movement of a selecting element on a user interface of an application executing on the computing device toward a control element of the user interface, wherein to detect includes detect the movement of the selecting element inside a designated area of the user interface that is proximate to the control element, wherein the designated area of the user interface proximate to the control element is configured to receive user input including the movement of the selecting element within the area;
in response to the detection, determining, by the computing device, whether to adjust properties of the control element;
if the determination is positive, adjusting, by the computing device, the properties of the control element and augmenting, by the computing device, basic information associated with the control element of the user interface;
otherwise, augmenting, by the computing device, basic information associated with the control element of the user interface, wherein the basic information includes a static definition of the control element and additional information to augment the basic information comprises a content summary of the application associated with the control element, wherein augmenting the basic information includes obtaining the content summary from a data repository that stores the content summary provided by the application associated with the control element, and replacing the basic information with the content summary of the application or adding to the basic information the content summary of the application; and rendering, by the computing device, for display in or proximate to the control element, the augmented basic information of the control element.

20. The computer-implemented method of claim 19, further comprising: gathering, by the computing device, content information accessible via the control element, or context information of the control element.

21. The computer-implemented method of claim 20, further comprising: processing, by the computing device, the content or context information to generate the augmented basic information.

22. The computer-implemented method of claim 19, wherein the control element is rendered for display in or proximate to an area of the user interface for interaction by a user of the computing device.

23. The computer-implemented method of claim 19, further comprising: adjusting, by the computing device, the control element to accommodate the rendering of the augmented basic information.

* * * * *